May 16, 1939.   E. W. BREISCH   2,158,979
INDUSTRIAL TRUCK AND TRACTOR BATTERY CHARGER
Filed April 13, 1936   4 Sheets-Sheet 1
Fig. 1
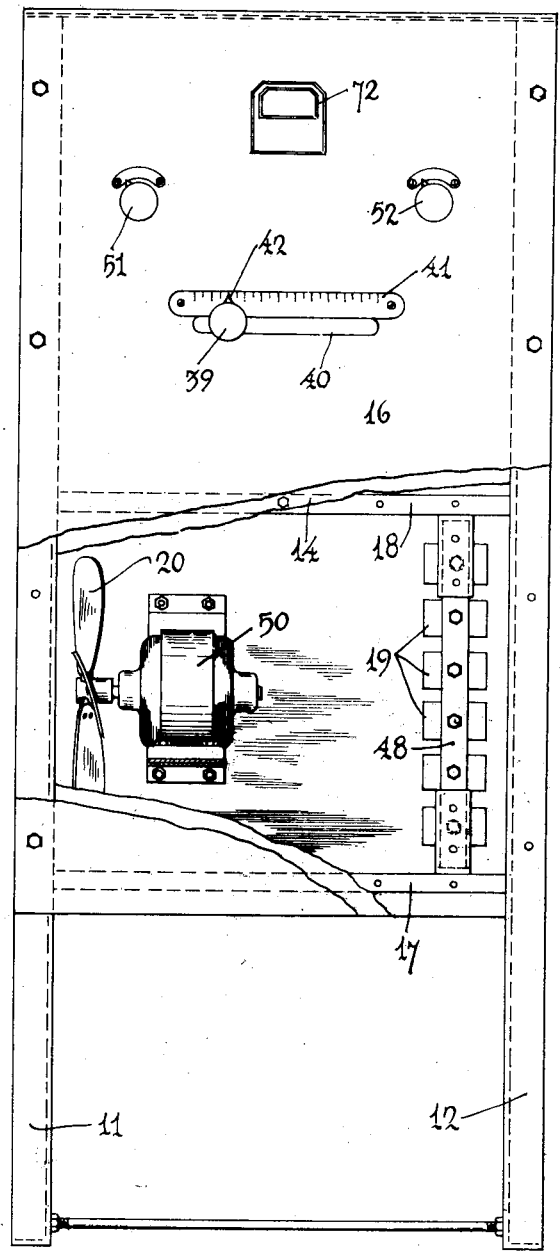
Fig. 2
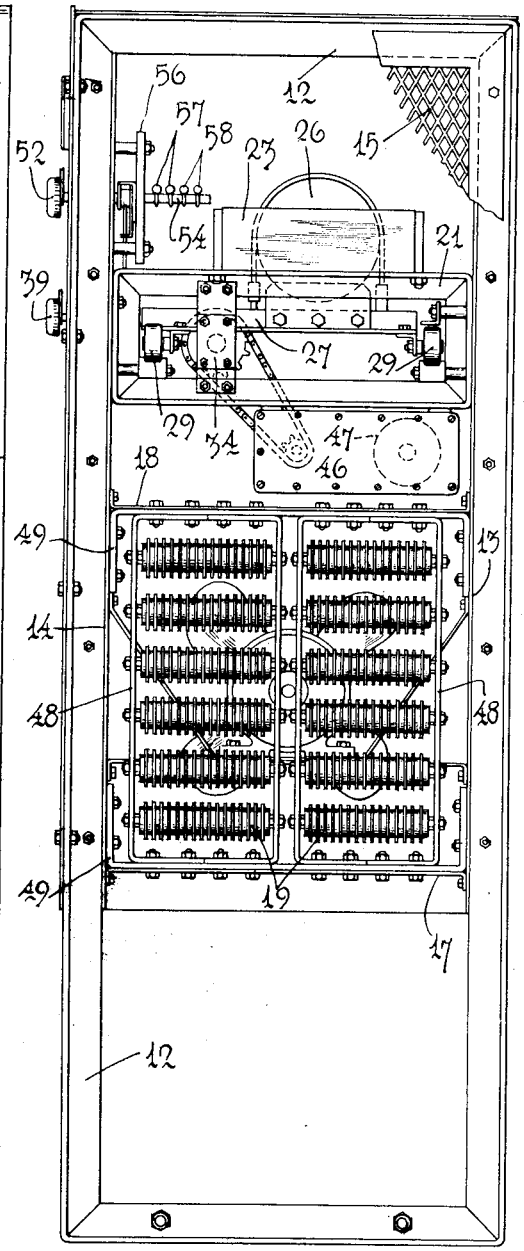
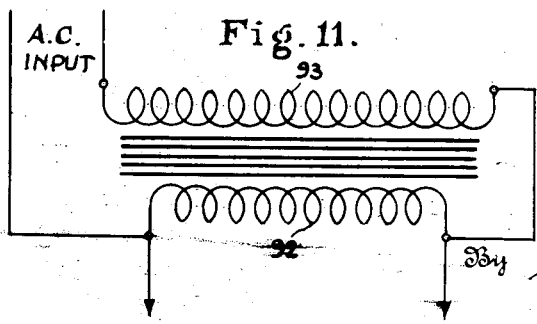
Fig. 11.
Inventor
Edgar W. Breisch
By
Attorneys

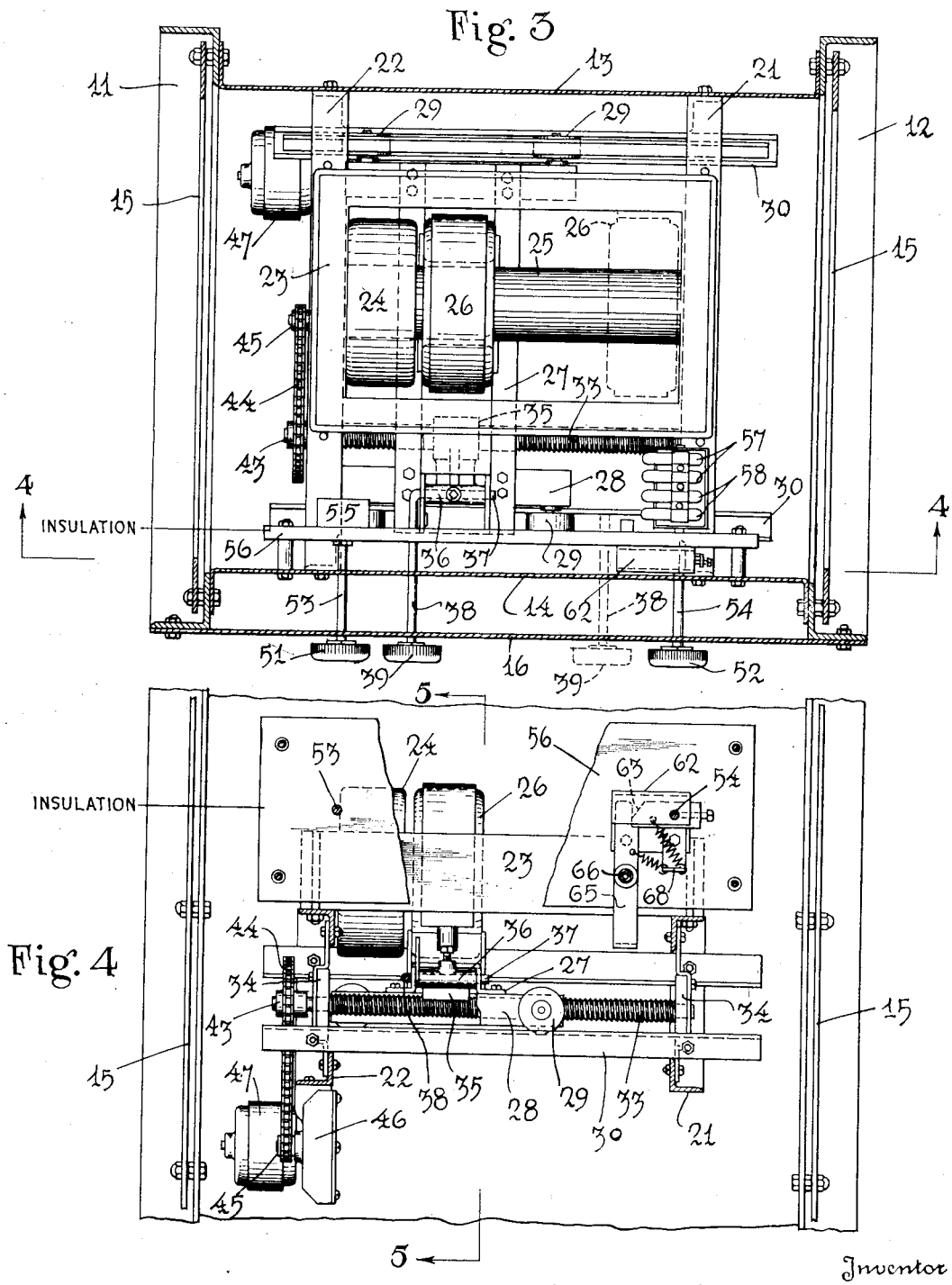

May 16, 1939.  E. W. BREISCH  2,158,979
INDUSTRIAL TRUCK AND TRACTOR BATTERY CHARGER
Filed April 13, 1936  4 Sheets-Sheet 3
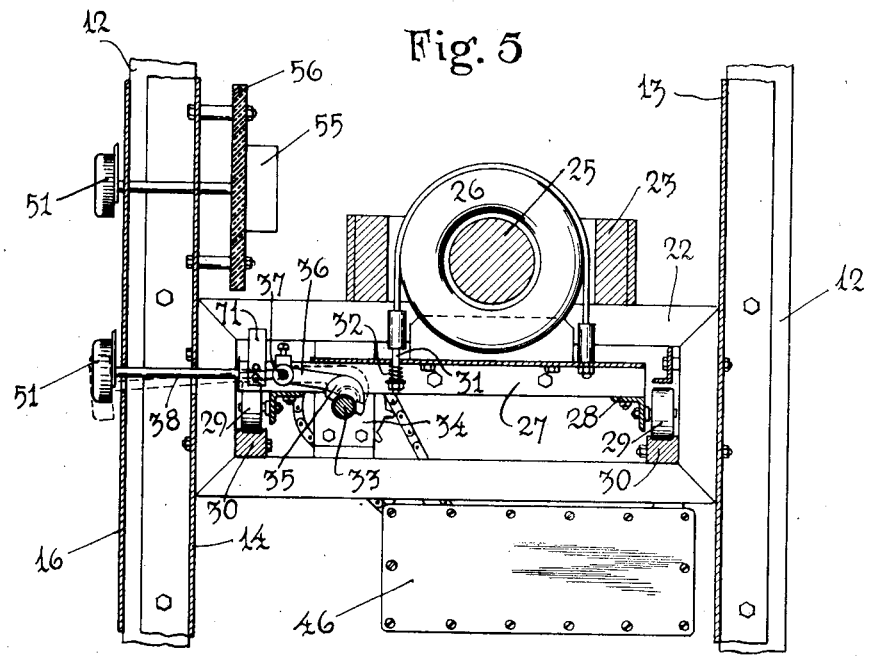
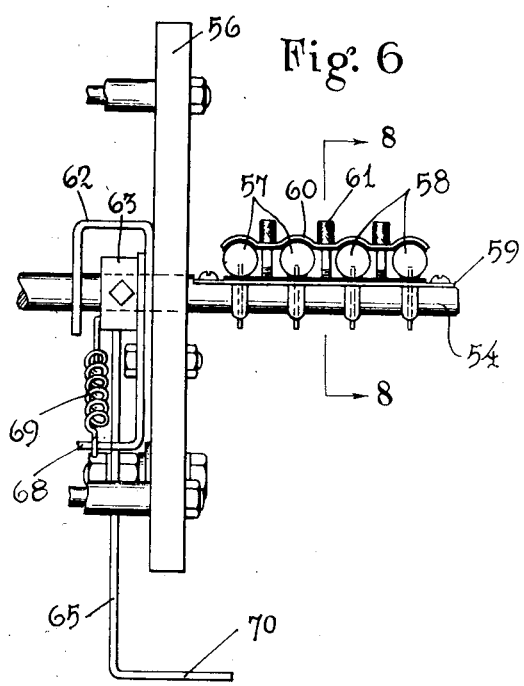
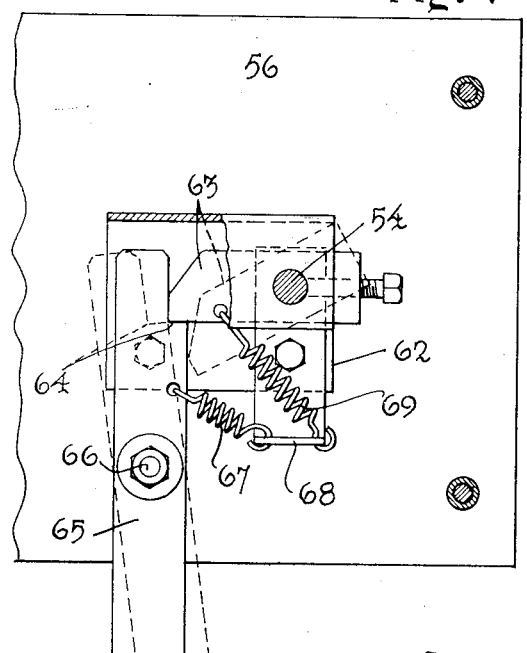
Inventor
Edgar W. Breisch
By Stryker & Stryker
Attorneys May 16, 1939.  E. W. BREISCH  2,158,979
INDUSTRIAL TRUCK AND TRACTOR BATTERY CHARGER
Filed April 13, 1936   4 Sheets-Sheet 4
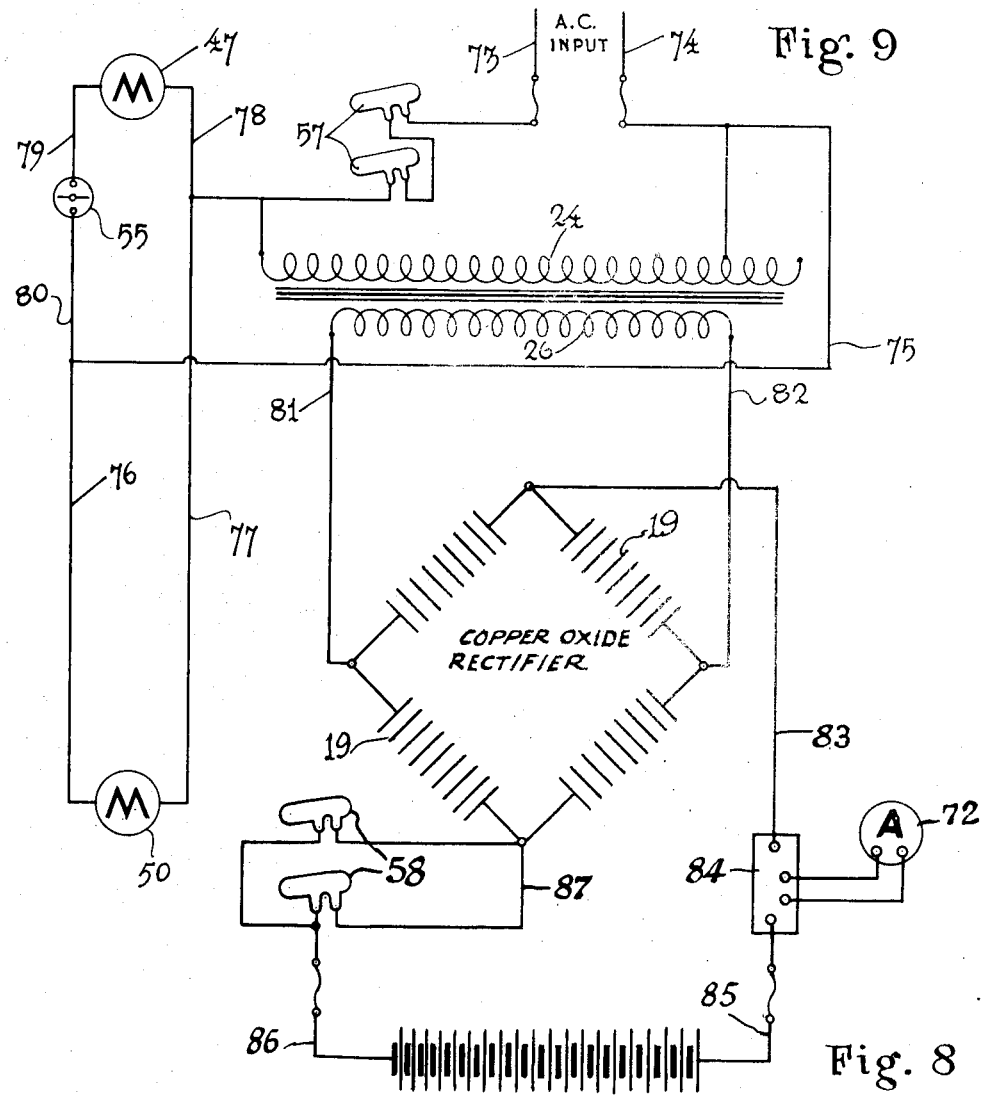
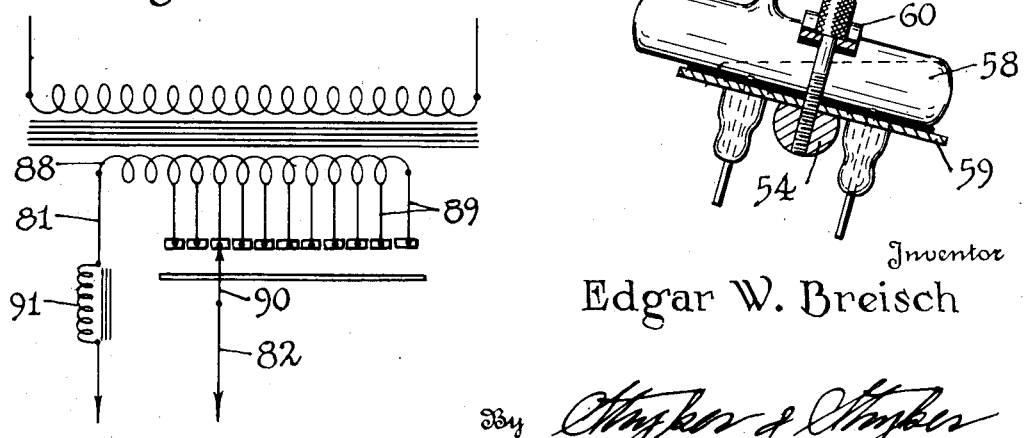
Inventor
Edgar W. Breisch
By Stryker & Stryker
Attorneys Patented May 16, 1939

2,158,979

UNITED STATES PATENT OFFICE 2,158,979

INDUSTRIAL TRUCK AND TRACTOR BATTERY CHARGER

Edgar W. Breisch, Lancaster, N. Y., assignor to National Battery Company, St. Paul, Minn., a corporaton of Delaware Application April 13, 1936, Serial No. 74,033

8 Claims. (Cl. 171—314)

This invention relates to a battery charger particularly, although not exclusively, adapted for use in charging batteries of industrial trucks and tractors, electric street trucks, mine locomotives, and the like.

It is my object to provide a novel charger of unusually inexpensive construction adapted to efficiently charge batteries of this class.

Another object is to provide a charger of suitable capacity for such use and of unusually durable construction, the current rectifier being static and other parts subject to a minimum of wear.

A particular object is to provide a novel charger adapted to utilize alternating current at the common commercial voltages and to deliver a direct current output of about 75 to 25 amperes at about 28 to 40 volts.

A further object is to provide a charger of this class having a novel arrangement of transformer, junction rectifier and controls whereby the output current may be regulated either manually or automatically for maximum efficiency in charging batteries of different types and in various conditions of charge.

Other objects will appear and be more fully pointed out in the following specification and claims.

In the accompanying drawings which illustrate the best form of my invention at present known to me:

Figure 1 is a front elevation of the charger cabinet with a portion of the front panel and wall broken away to show the rectifier units and cooling fan;

Fig. 2 is a side elevation of the machine with the guard screen removed, except a corner portion;

Fig. 3 is a horizontal section through the cabinet, showing the interior mechanism in plan;

Fig. 4 is a fragmentary, vertical section taken on the line 4—4 of Fig. 3;

Fig. 5 is a section taken on the line 5—5 of Fig. 4, with the guard screen omitted;

Fig. 6 is a side elevation of the mercury switches and associated mechanism;

Fig. 7 is a front elevation showing the switch-operating mechanism, a part of the bracket being broken away to show parts otherwise concealed;

Fig. 8 is a section taken on the line 8—8 of Fig. 6,

Fig. 9 is a wiring diagram of the machine,

Fig. 10 is a diagrammatic illustration of the connections for a transformer having one of the windings tapped at suitable intervals to provide a step by step reduction in the output potential, and Fig. 11 is a diagrammatic illustration of an alternate form of transformer.

As best shown in Figs. 1, 2, and 3, I provide standards 11 and 12, constructed from angle bars and rigidly connected together in spaced, parallel relation by a rear wall 13 and a front wall 14. Open mesh screens 15, preferably of the expanded metal type are bolted to the frame members 11 and 12 respectively to shield the mechanism and allow for the admission of cooling air. The top of the cabinet is closed by a suitable plate perforated to admit the alternating and direct current conduits and bolted to the frame members 11 and 12 is a front panel 16 from which the several controls, hereinafter described, project. The cabinet has a floor plate 17 and another horizontal plate 18 divides the interior into a lower compartment containing the rectifier units 19 and a motor-driven fan 20 and an upper compartment containing the transformer and control and timing mechanism.

Rigidly secured to the walls 13 and 14 are auxiliary frame members 21 and 22 constructed from angle bars and each consisting of two horizontal and two vertical angle members welded together into a rectangular structure. A large transformer, indicated generally by the numeral 23, is secured to the top of the members 21 and 22 and has a fixed primary coil 24, an elongated core 25 and a secondary coil 26 movable to and from the coil 24 along the core 25. The coil 26 is supported on a carriage having a pair of angle members 27 connected in spaced parallel relation to each other by similar members 28 (Figs. 3 and 5). Pairs of rollers 29 are mounted on the members 28 to run on tracks 30, these tracks being secured to the frame members 21 and 22. A suitable seat for the coil 26 is mounted on the carriage members 27 and the coil is held down by a band having its ends bolted to the carriage, as best shown in Fig. 5. The bolt 31 for securing one end of the band to the carriage projects beneath the latter and has a small compression spring 32 mounted thereon to permit expansion and contraction of the coil.

Motor-driven means are provided to move the coil 26 slowly along the core 25. A screw shaft 33 has suitable journal bearings 34 on the frame members 21 and 22 respectively and mounted on the carriage is a half nut 35 adapted to engage the screw 33. The nut is formed integral with an arm 36 which is fixed on a pivot pin 37 integral with a rod 38. As best shown in Fig. 3, the pin 37 has bearings formed in the carriage members 27 and extends at right angles to the rod 38. The free end of this rod has a handle 39 secured thereto in front of the panel 16. A horizontally elongated slot 40 is formed in the panel 16 and a similar slot is formed in the wall 14 to permit movement of the rod 38 with the carriage supporting the transformer coil 26 and also to permit sufficient vertical movement of the rod 38 to allow the nut 35 to be moved to and from engagement with the screw 33. Mounted on the panel 16 adjacent to the slot 40 is a scale 41 and fixed on the handle 39 is a pointer 42 which indicates the position of the coil 26 by reference to the scale 41.

The screw shaft 33 has secured thereto at one end a sprocket wheel 43 adapted to be driven by a chain 44 and sprocket wheel 45. Suitable gearing in a casing 46 is provided to drive the sprocket wheel 45 and this gearing is driven by a small electric motor 47 mounted on the casing 46.

As shown in Figs. 1 and 2, the rectifier units 19 are mounted in two horizontally spaced, vertical groups, each supported on a rectangular frame 48. These frames are bolted to suitable brackets 49 extending horizontally at the top and bottom and secured to the walls 13 and 14. An electric motor 50 is provided to drive the fan 20 so that the latter creates a partial vacuum in the lower cabinet chamber and efficiently cools the rectifier units, the cooling draft of air being drawn in through one of the screens 15 and between the rectifier units and the warm air being discharged through the opposite screen 15.

Electric switches for controlling the apparatus have handles 51 and 52 mounted respectively on spindles 53 and 54. The spindle 53 is operatively connected to a snap switch 55 arranged, as hereinafter described, in a circuit controlling the timing motor 47. To support the switch 55 and other electrical controls and operating mechanism, a panel 56 of electric insulating material is mounted in spaced parallel relation to the wall 14. The spindle 54 projects through the panel 56 and has pairs of mercury switches 57 and 58 mounted thereon so that these switches may be simultaneously opened and closed by appropriate rocking movement of the spindle. The switches 57 are arranged to control the alternating current supply circuits and the switches 58 control the direct current output circuit, as shown by the wiring diagram, Fig. 9.

As best shown in Figs. 6, 7 and 8, the upper surface of the spindle 54 is flat and has mounted thereon a supporting plate 59 for the switches 57 and 58. A retaining clamp 60 engages the switches 57 and 58 and is held down by small bolts 61 threaded in the spindle 54 and passing between the several switches. Suitable resilient pads are inserted between the supporting plate and tubular bodies of the switches and also between the clamp 60 and switches.

A latch and trip mechanism is provided on the front of the panel 56 in connection with the spindle 54. The latch has a channel-shaped bracket 62 bolted to the panel 56 and perforated to afford bearings for the spindle 54. Fixed on the spindle 54 between its bearings in the member 62 is a dog 63, one end of which is adapted to be supported in a notch 64 formed in a lever 65. This lever is pivoted on a bolt 66 projecting from the panel 56 and is urged toward its position indicated in full lines in Fig. 7 by a small spring 67. One end of this spring is secured to the lever 65 and the other end to a rigid support 68 depending from the bracket 62. Another spring 69 is attached to the support 68 and to the dog 63 to urge said dog toward the position indicated in dotted lines in Fig. 7. The lever 65 has an inwardly offset end 70 which projects into the path of a rigid trip member 71 mounted on the carriage supporting the transformer coil 26. It will be understood that the switches 57 and 58 are so positioned on the spindle 54 that they are in their closed position when the handle 52 of the trip mechanism is turned in a clockwise direction. Upon movement of the lever 65 to the dotted line position (Fig. 7), the dog 63 is released from the notch 64 and the spring 69 tilts the switches to their open position. The trip member 71 is so located on the transformer carriage that it strikes the lever 65 to open the switches as the carriage approaches the end of its movement to the right, as seen in Figs. 1 and 3. An ammeter 72 is mounted near the top of the panel 16 and this meter is connected in the direct current output circuit, as shown in Fig. 9. As further indicated by the wiring diagram, an alternating current supply is indicated by the wires 73 and 74 and the primary coil 24 of the transformer is placed in series with the switches 57 in the supply circuit. One branch of this circuit includes the fan motor 50 and wires 75, 76 and 77. A second branch of the alternating current circuit comprises a wire 78, the motor 47, wire 79, switch 55 and wire 80, connected to wire 75.

The secondary coil 26 is included in an entirely separate, direct current circuit including the rectifier units 19, wires 81 and 82 severally connecting the banks of rectifying units to the secondary coil, wire 83 extending to a shunt 84 for ammeter 72 and wire 85. A second output circuit wire 86 extends to branch circuits including the switches 58 in parallel with each other. A wire 87 connects these circuits to the output side of one rectifier group. As indicated, the rectifier units are arranged in balanced groups and are preferably of the copper oxide type, although other junction rectifiers may be employed. Suitable fuses are placed in the alternating and direct current circuits, as indicated in Fig. 9, and these fuses are preferably mounted on the panel 56.

As shown in Fig. 10 a transformer having one of its windings tapped at suitable intervals may be employed in place of the moving coil transformer of the preferred construction. The secondary coil 88 of this transformer is provided with a multiplicity of taps 89 which are successively contacted by a movable contact member 90. The output circuit wire 82 is connected to the member 90 and the wire 81 to one end of the winding 88. The member 90 is moved at such rate that it will travel from the extreme left to the extreme right tap during a period of ten hours and a sufficient number of the taps 89 are provided to reduce the output potential step by step at intervals of one hour. The member 90 remains in contact with each tap for a period of one hour. The member 90 may be actuated by a screw-threaded shaft, such as the shaft 33, so that the moving member 90 completes the circuit through each of the successive taps 89 for a predetermined period of time. The change from one position to another should be made without appreciable loss of time and where the transformer is of the type with good regulation, the necessary current control may be secured by placing a reactor 91 in the output circuit, as illustrated in Fig. 10, or in the input circuit including the primary winding of the transformer. Suitable mechanism for making the successive contacts with the taps 89 is well known in this art. For example, the movable nut on the shaft 33 may actuate overcenter contactors or snap switches so constructed that they snap to either open or closed position with a quick movement as they pass a dead center position and being spring actuated to open position except when held closed by the motor or clock operated mechanism.

Operation

My improved charger may be operated in different ways to efficiently charge batteries of various types and in various conditions of charge. Where the battery is of the lead-acid type and is to be recharged from a substantially discharged condition, best results are obtained by starting with the maximum rate of charge and gradually reducing this during a period of about ten hours, the final charging rate being equal to about one-half of the maximum.

Where, as in many vehicles, the battery contains fourteen to sixteen cells of the lead-acid type an initial charging rate of 65 to 75 amperes at approximately 28 volts is required and this should be gradually reduced to approximately 25 amperes at 40 volts at the end of the charging period. My charger is particularly adapted to fulfill such requirements. To operate my improved charger under the normal conditions with a lead-acid battery, the battery is connected to the output circuit wires 85 and 86, the snap switch 55 is closed by appropriate movement of the handle 51 and the switches 57 and 58 are closed by turning the handle 52 of the spindle 54 to the right as seen in Figs. 1 and 7. Turning the spindle 54 to the right forces the dog 63 into the notch 64 against the action of the springs 67 and 69 and moves the switches 57 and 58 to the closed position indicated in Fig. 8. The switches will remain in this closed position until the lever 65 is actuated to release the dog 63 from the notch 64.

When the operation is to start with the maximum rate of charging, the handle 39 is manipulated to move the secondary coil 26, together with its carriage, to the extreme left as seen in Figs. 1 and 3, so that there is a minimum of leakage between the primary and secondary coils of the transformer. When the handle 39 is released the nut 35 engages the screw shaft 33. The timing motor 47 and fan motor 50 operate when the switches 55 and 57 are closed so that, under the conditions stated, the timing motor slowly turns the screw shaft 33 through the speed reducing gears, chain 44 and sprocket wheels 43 and 45. The rate of turning the shaft 33 is preferably such that the secondary coil 26 is moved from its maximum to its minimum charging position during a period of about ten hours. Throughout this period the direct current output is gradually reduced. This charges the battery in a minimum of time while avoiding damage such as is caused by too rapid charging, with resulting excessive gassing, overheating, etc. At the end of the predetermined charging period, the contact member 71 on the transformer carriage actuates the lever 65 to release the dog 63 from the notch 64. This automatically opens the switches 57 and 58 controlling the alternating and direct current circuits respectively.

My machine is also adapted to efficiently recharge a battery requiring less than a full charge, or one which has not been completely discharged. By a simple test the percentage of charge remaining in such a battery may be determined. The corresponding position for the handle 39 and initial rate of charging is indicated on the scale 41. Where, for example, a battery contains 50% of its full charge, the recharging is started with the pointer 42 on handle 39 at the corresponding point on the scale 41. Such a battery is efficiently recharged and the current supply automatically cut off at the end of the proper period of charging.

Another method of operation is required for nickel-alkaline batteries such as Edison batteries. To charge such batteries, the timing motor control switch 55 is moved to the open position by suitable manipulation of the handle 51 and the handle 39 is set at such position relative to the scale 41 and by reference to the ammeter 72 as to give the rate of charging desired within the capacity of the apparatus. It will be understood that with the timing motor out of operation the rate of charging is constant for any position of the handle 39 and may be changed from time to time, as desired, by suitable manipulation of the handle 39. What is termed a "boosting charge" may be given the battery by setting the control handle 39 for the maximum charging rate and allowing the charging to continue for a short period of time. Other methods of operation known as "triple" and "double rate" charging may also be utilized with my improved apparatus.

I have found that for charging batteries of 14 to 16 cells the transformer should produce in the secondary coil a maximum alternating current voltage of about 75 volts. This is reduced to about 40 volts D. C. by the rectifier and the maximum direct current output equals about 75 to 65 amperes, depending upon the alternating current input rating. For other types of vehicles, such as mine locomotives and electric street trucks, a maximum charging rate of about 100 amperes at a voltage of not less than 120 volts is required. My improved charger is adapted to meet these requirements and even considerably higher output current and voltage requirements.

A number of modifications in the preferred details will be obvious to those skilled in this art. For example, in place of the moving coil transformer, a tapped transformer with voltage reductions made periodically, such as one each hour, throughout the charging period, as illustrated and described herein with reference to Fig. 10 of the drawings, is considered to be within the spirit of the invention. The timing or progressive reduction of the secondary voltage may also be accomplished by the use of a synchronous motor or clock operated timing mechanism. For obvious reasons, including that of safety, it is preferable to have the direct current circuits entirely separated from the power supply circuits. However, where the current supply voltage is low, or does not greatly exceed about 115 volts, an auto or single winding transformer such as that shown in Fig. 11 may be used in place of the double winding transformer illustrated and described in detail herein. Windings 92 of this auto-transformer may be moved relative to the windings 93 to progressively reduce the output potential or windings 92 may be tapped as illustrated and described with reference to Fig. 10.

Having described my invention, what I claim as new and desire to protect by Letters Patent is:

1. An industrial truck and tractor battery charger comprising, a transformer having relatively movable primary and secondary windings, a junction rectifier, a circuit for supplying alternating current to said primary winding, a control switch included in said circuit, a second circuit including the secondary winding of said transformer and said rectifier, a multiplicity of batteries, a direct current output circuit from said rectifier including said batteries, means for slowly moving one of said windings relative to the other during an extended period of time and means for the actuating said switch at the end of said period.

2. An industrial truck and tractor battery charger comprising, a transformer having relatively movable primary and secondary windings, a junction rectifier, a circuit for supplying alternating current to said primary winding, a second circuit including the secondary winding of said transformer and said rectifier, a third circuit for the direct current output from said rectifier, a multiplicity of batteries to be charged included in said third circuit, an electric motor, means operable by said motor for moving one of said windings relative to the other, a branch of said first mentioned circuit including said motor in parallel to said primary winding, a switch controlling said first mentioned and branch circuits and means operable by said motor for automatically opening said switch.

3. An industrial truck and tractor battery charger comprising, a transformer having relatively movable primary and secondary windings, a junction rectifier, a circuit for supplying alternating current to said primary winding, a second circuit including the secondary winding of said transformer and said rectifier, a third circuit for the direct current output from said rectifier, a multiplicity of batteries to be charged included in said third circuit, an electric motor, means operable by said motor for moving one of said windings relative to the other, a branch of one of said first mentioned circuits including said motor, switches arranged to control said first mentioned, third and branch circuits and means operable by said motor for actuating said switches.

4. An industrial truck and tractor battery charger comprising, a transformer having relatively movable primary and secondary windings, a copper oxide rectifier, timing and fan motors, a circuit for supplying alternating current to said primary winding, branches of said circuit respectively including said timing and fan motors, a second circuit including the secondary winding of said transformer and said rectifier, a third circuit for the direct current output from said rectifier, a multiplicity of batteries to be charged included in said third circuit, a fan operable by said fan motor and arranged to cool said rectifier, means operable by said timing motor for moving one of said windings relative to the other, switches for controlling said first-mentioned, third and branch circuits and means operable by said timing motor for automatically opening said switches.

5. An industrial truck and tractor battery charger comprising, a transformer having primary and secondary windings and a movable member for varying the inductance thereof, a junction rectifier, a circuit for supplying alternating current to said primary winding, a control switch included in said circuit, a second circuit including the secondary winding of said transformer and said rectifier, a multiplicity of batteries, a direct current output circuit from said rectifier including said batteries, means for slowly moving said transformer member during an extended period of time to progressively reduce the output potential therefrom and means for actuating said switch at the end of said period.

6. An industrial truck and tractor battery charger comprising, a transformer of variable inductance type having primary and secondary windings, a junction rectifier, a circuit for supplying alternating current to said primary winding, a control switch, a second circuit including the secondary winding of said transformer and said rectifier, a multiplicity of batteries, a direct current output circuit from said rectifier including said batteries, movable means for varying the inductance of said transformer to regulate the output potential therefrom, means for slowly actuating said movable means during an extended period of time and means for actuating said switch at the end of said period.

7. In a battery charger of the class described, a transformer having primary and secondary windings and a member movable to regulate the inductance thereof, a junction rectifier, a circuit for supplying alternating current to said primary winding, a control switch included in said circuit, a second circuit including the secondary winding of said transformer and said rectifier, a direct current output circuit from said rectifier for the batteries to be charged, an electric motor operatively connected to said movable member for progressively reducing the output potential from said rectifier during an extended period of time, manually operable means for setting said movable member to determine the initial charging rate and duration of the charging period and means operable by said motor for actuating said switch to open position at the end of said period.

8. In a battery charger of the class described, a transformer having primary and secondary windings and a member movable to regulate the inductance thereof, a junction rectifier, a circuit for supplying alternating current to said primary winding, a second circuit including the secondary winding of said transformer and said rectifier, a direct current output circuit from said rectifier, batteries to be charged included in said output circuit, a switch controlling said output circuit, a motor operatively connected to said movable member for progressively varying the output potential from said rectifier during an extended period of time, manually operable means for setting said movable member to determine the initial charging rate and means operable by said motor for actuating said switch to open position at the end of said period.

EDGAR W. BREISCH.